(12) United States Patent
Denmon

(10) Patent No.: US 10,517,291 B2
(45) Date of Patent: Dec. 31, 2019

(54) INTERMITTENT FLASHING DECOY APPARATUS, METHOD AND SYSTEM

(71) Applicant: Huntwise, Inc., Monroe, LA (US)

(72) Inventor: Terry Denmon, Monroe, LA (US)

(73) Assignee: Huntwise, Inc., Monroe, LA (US)

(*) Notice: Subject to any disclaimer, the term of this patent is extended or adjusted under 35 U.S.C. 154(b) by 345 days.

(21) Appl. No.: 15/255,998

(22) Filed: Sep. 2, 2016

(65) Prior Publication Data
US 2017/0055521 A1    Mar. 2, 2017

Related U.S. Application Data

(60) Provisional application No. 62/213,271, filed on Sep. 2, 2015.

(51) Int. Cl.
*A01M 31/06* (2006.01)
*G02B 26/08* (2006.01)

(52) U.S. Cl.
CPC ......... *A01M 31/06* (2013.01); *G02B 26/0816* (2013.01)

(58) Field of Classification Search
CPC ...... A01M 31/06; A01M 29/10; A01M 29/06; B63B 22/166; A01K 85/01
USPC .......................... 116/22 A, 22 R; 441/11, 13
See application file for complete search history.

(56) References Cited

U.S. PATENT DOCUMENTS

| | | | | |
|---|---|---|---|---|
| 1,974,832 A | * | 9/1934 | Peterson | B63B 22/166 250/487.1 |
| 2,722,195 A | * | 11/1955 | Rockafeller | A01M 29/06 116/22 A |
| 2,819,476 A | * | 1/1958 | Dodge | B63B 22/16 220/220 |
| 3,292,319 A | * | 12/1966 | McCarthy | A01M 29/06 116/22 A |
| 3,814,500 A | * | 6/1974 | Ebenbichler | A01M 29/08 359/514 |
| 4,099,282 A | * | 7/1978 | Townsend | B63C 9/21 441/16 |
| 4,131,079 A | * | 12/1978 | Rousseau, Jr. | G09F 7/22 116/22 A |
| 4,252,409 A | * | 2/1981 | Schwab | A01M 29/08 359/527 |
| 4,366,562 A | * | 12/1982 | McGinty | A01M 29/16 116/22 A |

(Continued)

FOREIGN PATENT DOCUMENTS

| | | | | |
|---|---|---|---|---|
| FR | 2365816 A1 | * | 4/1978 | ............ A01M 29/08 |
| WO | WO-2008051685 A2 | * | 5/2008 | ............ A01M 29/06 |

*Primary Examiner* — Magdalena Topolski
(74) *Attorney, Agent, or Firm* — Robert Devin Ricci; Lauren J. Ricinski; Kean Miller LLP

(57) ABSTRACT

An intermittent flashing decoy having a housing unit, a power source, a motor, a cycler, a switch, and a flasher, wherein the motor, power source, and cycler are substantially housed within the housing unit, and wherein the power source is capable, when the apparatus is turned on via the switch, of powering the motor off and on at random as controlled by the cycler, which is an intermittent timer chip, to manipulate the flasher as to create intermittent "flashes" as flasher rotates and reflects light such as sunlight. A system of two or more intermittent flashing decoys wherein each decoy is controlled by an intermittent timer chip, the cycler, so that no pattern of flashing occurs between any two decoys.

16 Claims, 10 Drawing Sheets

(56) References Cited

U.S. PATENT DOCUMENTS

| | | | | |
|---|---|---|---|---|
| 4,586,456 A * | 5/1986 | Forward | ............... | B63C 9/20 116/210 |
| 4,597,357 A * | 7/1986 | LeMessurier | ......... | A01M 29/08 116/22 A |
| 4,620,385 A * | 11/1986 | Carranza | ............... | A01M 31/06 428/16 |
| 4,896,620 A * | 1/1990 | Jones | ............... | B63B 51/02 114/253 |
| 5,277,516 A * | 1/1994 | Strieter | ............... | A01M 29/08 404/14 |
| 6,351,908 B1 * | 3/2002 | Thomas | ............... | A01M 29/06 116/22 A |
| 6,460,284 B1 * | 10/2002 | Rabo | ............... | A01M 31/06 43/17.5 |
| 6,557,482 B1 * | 5/2003 | Doty, III | ............... | A01M 29/06 116/150 |
| 6,558,011 B2 * | 5/2003 | Fritz | ............... | E01F 9/619 359/547 |
| 7,225,583 B1 * | 6/2007 | Stacy | ............... | A01K 85/01 43/17.5 |
| 7,610,713 B1 * | 11/2009 | Eilers | ............... | A01M 31/06 43/3 |
| 9,107,401 B1 * | 8/2015 | Brajovic | ............... | A01M 31/06 |
| 9,857,040 B1 * | 1/2018 | Bitterman | ............... | F21S 11/005 |
| 2002/0069571 A1 * | 6/2002 | Price, Sr. | ............... | A01M 31/06 43/3 |
| 2007/0193498 A1 * | 8/2007 | Wells | ............... | A01M 29/10 116/22 A |
| 2010/0060196 A1 * | 3/2010 | Aicher | ............... | A01M 29/10 315/294 |
| 2011/0000419 A1 * | 1/2011 | Gauthier | ............... | A01M 29/16 116/22 A |
| 2011/0065342 A1 * | 3/2011 | Hudson | ............... | B63C 11/26 441/16 |
| 2014/0224171 A1 * | 8/2014 | Donoho | ............... | A01M 29/06 116/22 A |
| 2015/0010399 A1 * | 1/2015 | Bahat | ............... | A01M 29/08 416/1 |
| 2016/0227757 A1 * | 8/2016 | Jacobson | ............... | A01M 29/08 |
| 2017/0164603 A1 * | 6/2017 | Kovarik | ............... | A01M 29/10 |
| 2018/0045400 A1 * | 2/2018 | Bushee | ............... | A01K 85/01 |
| 2018/0293852 A1 * | 10/2018 | Vaught | ............... | G08B 5/38 |
| 2018/0310538 A1 * | 11/2018 | Supinski | ............... | A01K 85/14 |

\* cited by examiner

INTERMITTENT FLASHING DECOY APPARATUS, METHOD AND SYSTEM

CROSS REFERENCE TO RELATED APPLICATIONS

This application claims priority to U.S. Provisional Patent Application No. 62/213,271, filed on Sep. 2, 2015, entitled "Intermittent Flashing Decoy Apparatus, Method and System."

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

It should be understood that the drawings are not necessarily to scale; instead, emphasis has been placed upon illustrating the principles of the invention. In addition, in the embodiments depicted herein, like reference numerals in the various drawings refer to identical or near identical structural elements.

DISCUSSION

Figure 1:
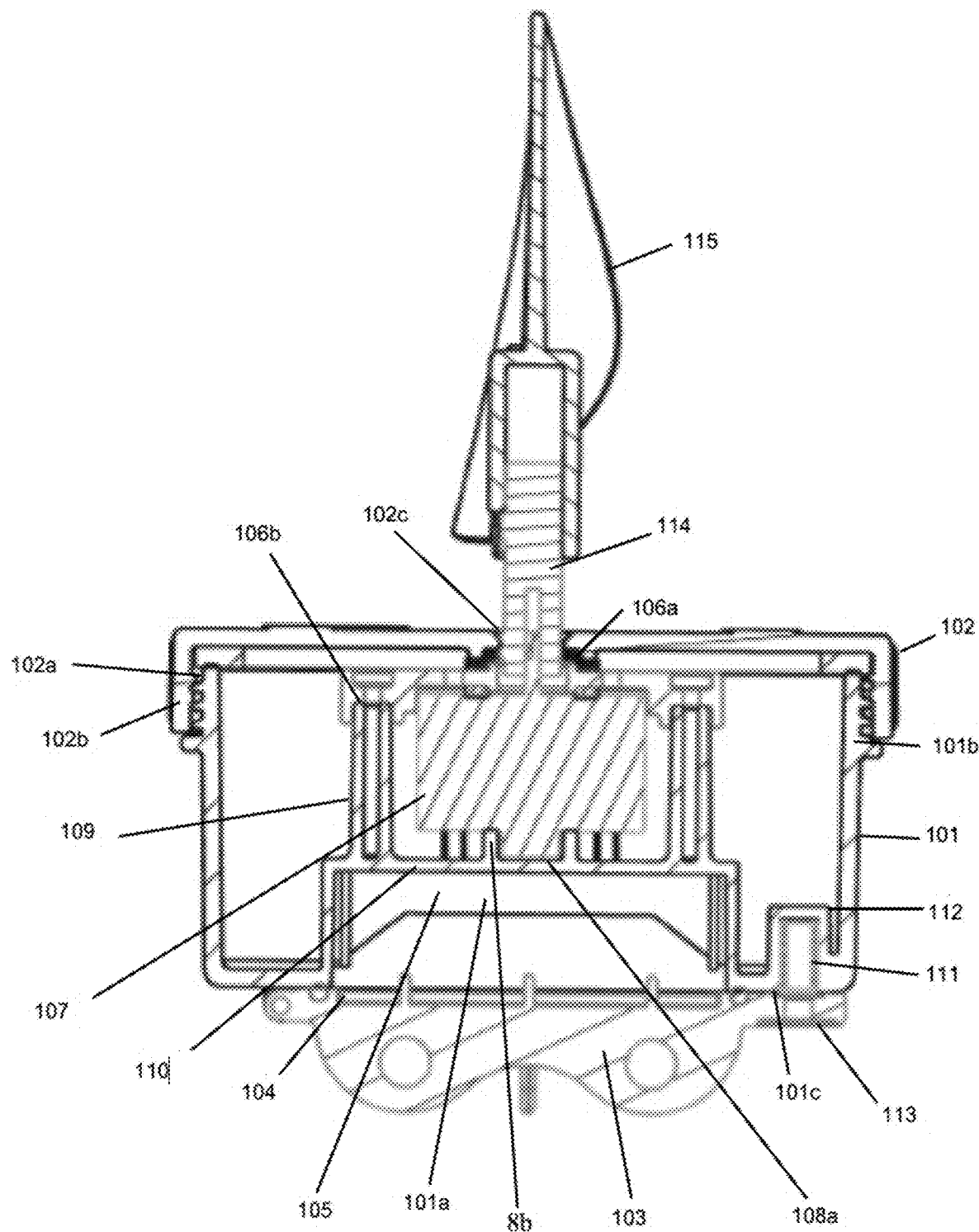
FIG. 1 is a cross sectional view showing an embodiment of an intermittent flashing decoy apparatus to demonstrate the interplay of the components depicted in FIG. 2.
Figure 1A:
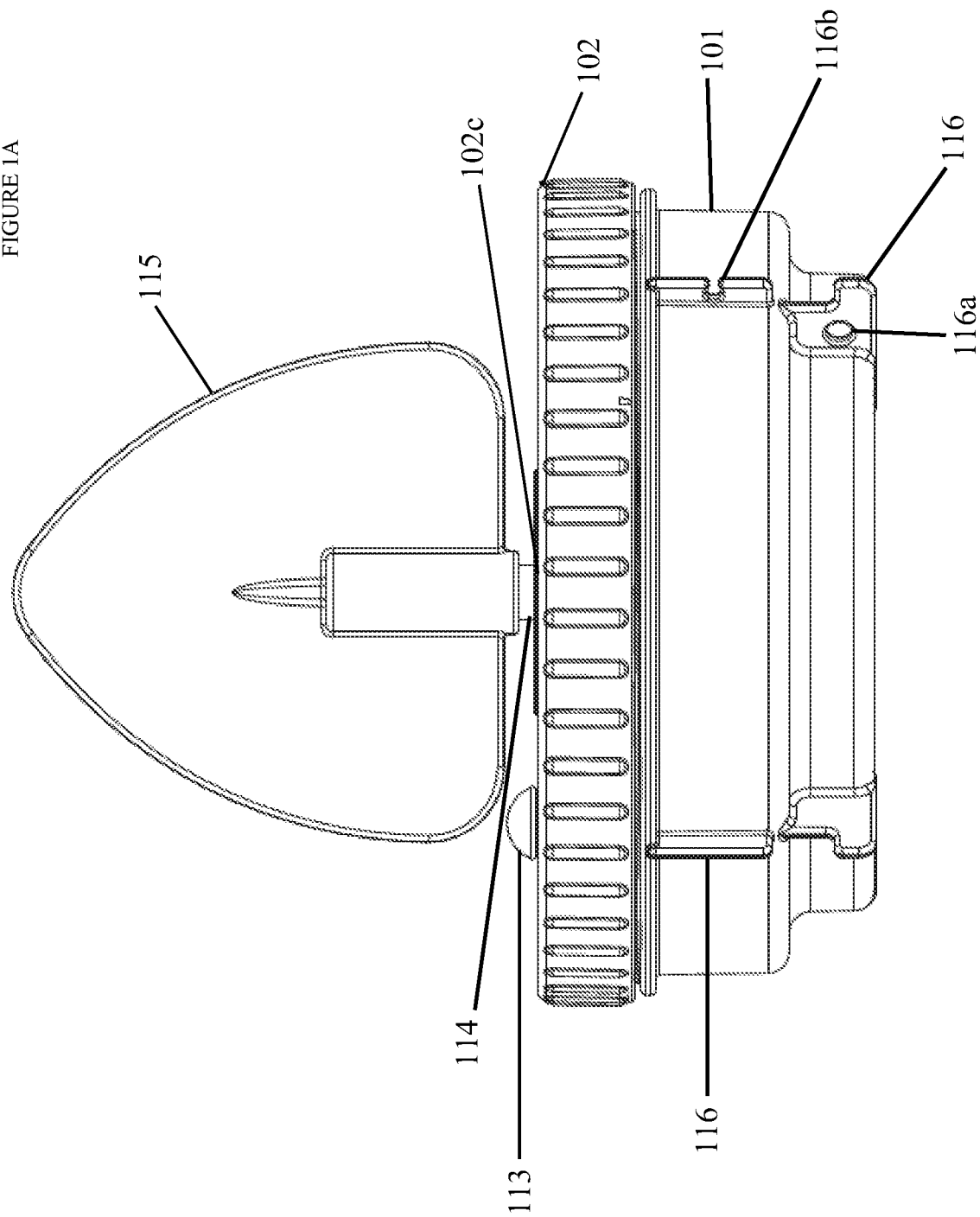
FIG. 1a is a cross sectional view showing an embodiment of an intermittent flashing decoy apparatus to demonstrate the interplay of the components.
Figure 2:
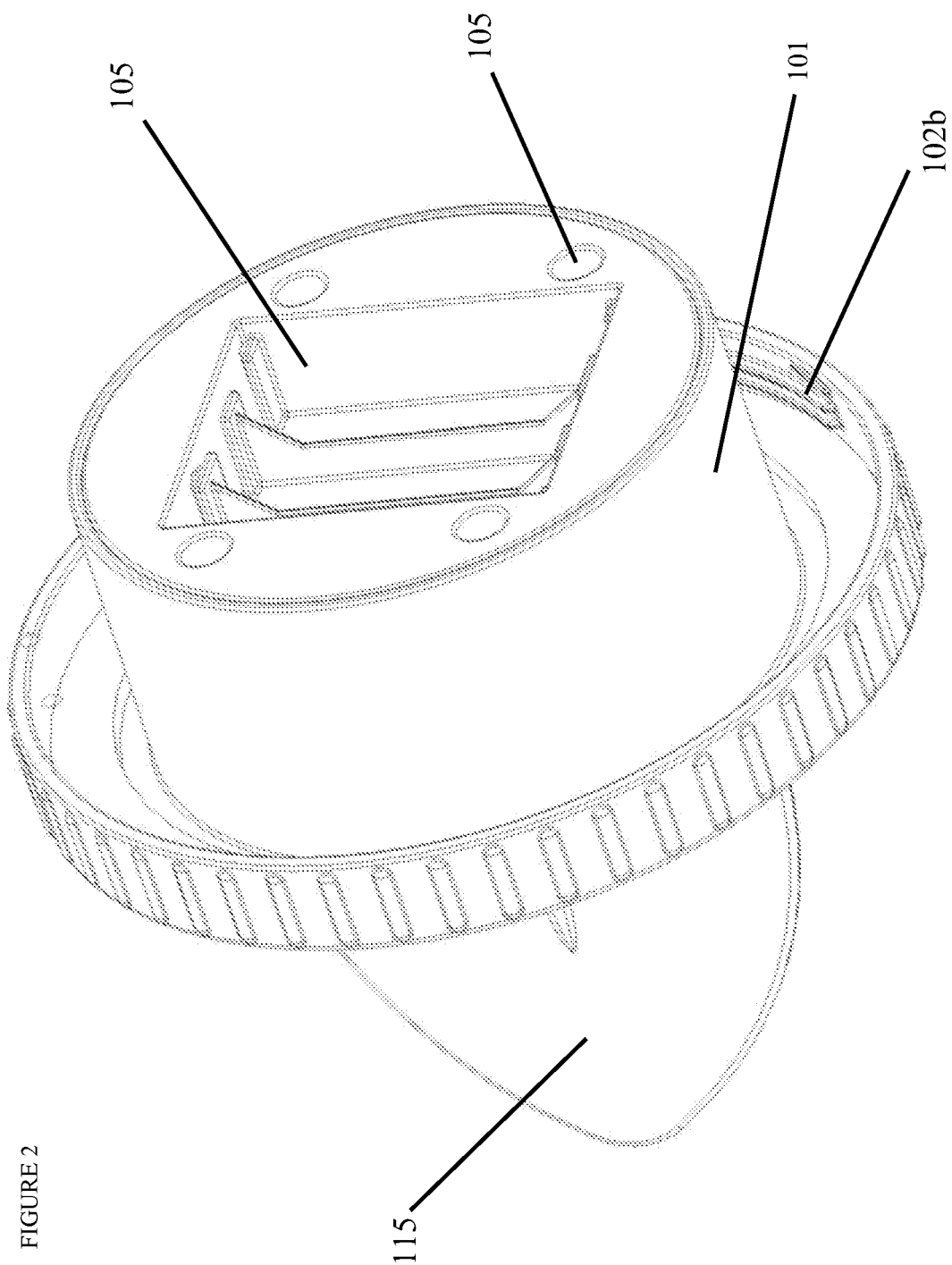
FIG. 2 shows representative examples of components comprising an embodiment of an intermittent flashing decoy apparatus.

Outdoor enthusiasts, recreational hunters, and photographers have long recognized that live animals and game, and particularly live waterfowl, are attracted to areas that appear to be inhabited by similar animals. For this reason, hunters have used decoys to attract live game to within shooting distance of a hunter's rifle, shotgun or other weapon, and within prime viewing distance of photographers and other outdoor enthusiasts. Likewise, decoys and other animal-shaped structures are also often used to deter certain animals from entering into an area such as an owl or hawk shaped decoy employed to keep mice away from an area.

The present invention relates to a decoy apparatus and system, using an enclosure to house a motor that is capable of moving a flashing component in a manner that the component will reflect light, attracting animals to a particular area or deterring smaller rodents from entering a particular area. In one or more embodiments, the apparatus is intended to be used in a marine environment such as a marsh and the enclosure is waterproof.

The widespread popularity of hunting has been met with a large increase in decoy sales and usage throughout the United States. Traditional decoys are simple plastic, animal shaped bodies used to attract live animal counterparts. Through time and extensive usage, animals became "decoy wise" and learned to avoid such attractions. Intuition in the decoy market led to the creation and mass-adoption of motion decoys to fool the otherwise "decoy wise" animals. However, the acknowledged "weak link" for many forms of hunting remains the decoys. Even the motion decoys have their drawbacks because they are often expensive to produce, have higher upkeep, are substantially large, or exhibit combinations of the above limitations. Moreover, while improved decoys do incorporate a motion element, they remain limited in that multiple "motion decoys" generally behave in the same or similar manner, creating a pattern by which animals can become "decoy wise" to even the most expensive of motion decoys.

A decoy apparatus is disclosed herein which uses a variable chip or controller attached to a motor which acts as an intermittent cycler to variably power on and off a motor attached to a flasher. In one or more embodiments, the decoy apparatus can be used with or without a traditional decoy body, allowing the cost of the system to be greatly reduced. Moreover, a system is provided herein wherein multiple of such decoys is employed concurrently, thereby creating the appearance of a flock of decoys, wherein at least two intermittent flashing decoy apparatuses can be employed, each of which will be controlled by its own cycler so that no two decoys "flash" in an identical pattern.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided, such as examples of apparatuses, mediums, frequencies, and application times. One skilled in the relevant art will recognize, however, that the disclosed Intermittent Flashing Decoy Apparatus, Method and System may be practiced without one or more of the specific details, or with other methods, components, materials, and so forth. In other instances, well-known structures, materials, or operations are not shown or described in detail to avoid obscuring aspects of the invention.

As will be explained in greater detail herein, the embodiment of the Intermittent Flashing Decoy Apparatus depicted in FIG. 1 is based on a device generally comprising a housing unit 100, a power source 105a, a motor 107, a cycler 110, a switch 111, and a flasher 115, wherein the motor 107, power source 105a, and cycler 110 are substantially housed within the housing unit 100, and wherein the power source 105a is capable, when the apparatus is turned on via the switch 111, of powering the motor 107 off and on as controlled by the cycler 110 to manipulate the flasher 115 as to create intermittent "flashes" as flasher 115 rotates and reflects light such as sunlight.

Many decoy applications occur in nature where the decoys will be subject to the elements. Moreover, it is envisioned that the Intermittent Flashing Decoy Apparatus, Method and System may be used in a wet environment. Therefore, in multiple embodiments, including the one depicted, housing unit 100 is a substantially waterproof shell which is used to house motor 107, power source 105a, and cycler 110 to aid in preventing these electrical components from being exposed to water or other elements which may short the electrical components. Working from the outside inwards, housing unit 100 comprises a motor housing body 101, a power source bay 105 located in the base of motor housing body 101, a lid 102, and a battery cover 103. Typically, the components which make up the housing unit 100 are of a suitably rigid material to protect the motor 107 and control components which are to be housed within the housing unit 100, and in many embodiments will comprise a plastic or other resin polymer. However, the various components could be formed out of numerous materials suitable for this purpose.

As depicted, motor housing body 101 and lid 102 are connected via corresponding threading, wherein motor housing body 101 comprises an external threading 101b substantially adjacent to its upper edge which correspond with internal threading 102b on the inside wall of lid 102. When the embodiment is intended to be waterproof, a lid seal gasket 102a may be used in conjunction with the threading to prevent water from seeping into the housing unit 100 at the threading connection. However, multiple variations and different connecting means are capable of being used, many of which may not utilize a lid seal gasket such as the one shown as 102a. As previously indicated, the power source bay 105 of the present embodiment is a cavity formed into the base of housing unit 100 that is capable of storing the power source 105a that provides power to the motor 107. In the instant embodiment, the opening comprising power source bay 105 is formed directly into the base of the housing unit 100 such that the power source 105a is capable of being inserted and removed as necessary without the need to remove the lid 102.

In an alternate design of the present embodiment, the lid 102 can be fused or otherwise permanently attached to the housing unit 100. While this will prevent access to the motor housed within the unit, it would further seal the housing chamber from the elements. Moreover, the external nature of the battery cover 103 in this embodiment would still allow for the power source to be removed or inserted.

Battery cover 103 is shaped to substantially cover the opening to power source bay 105. Battery cover 103 is hinged onto the underside of the housing unit 100 so that the battery cover 103 is capable of moving from an open to a closed position with relation to opening to power source bay 105. Moreover, the battery cover 103 can be secured in a closed position via numerous securing means such as a screw passing through an opening of the battery cover 103 which corresponds to a threaded hole in the underside of the housing unit 100. Additionally, when the apparatus will be used in wet environments, battery seal 104 is used to prevent water from seeping into to power source bay 105. Within the housing unit 100, power source connector conduits (wires) run current from the power source 105a to the cycler 110 and then to motor 107.

Switch 111 acts as the on/off switch for the apparatus. Accordingly switch 111 is preferably accessible from the exterior of the housing unit 100. To accomplish this goal, switch 111 is mounted such that it extends outwards from the interior of the housing unit 100 to the exterior through switch hole 101c in the motor housing body 101 by attaching switch 111 to switch mount 112 which is attached to the wall of the motor housing body 101. Switch mount 112 has ridges that aid in creating at least a partial seal around switch hole 101c, thereby substantially preventing water from entering the enclosure. Additionally soft button 113 is attached around switch 111, further preventing liquid from entering the enclosure and protecting the wiring attached to the switch 111.

Motor 107 is any motor as well understood in the art which is capable of rotating a drive shaft 114 which in turn is connected to flasher 115. It is desired, although not required, that the motor 107 is a low voltage motor capable of operating on a portable power source to a sufficient efficiency such that it can rotate the drive shaft 114 and, thus, the flasher 115 for a period of at least 4 hours. It is preferable that the motor 107 is capable of operating for at least 6 hours from the power source 105a on an intermittent basis as discussed below. In alternate embodiments, motor 107 can be an AC motor, a DC motor, a non-geared motor or a gear motor.

The motor 107 and drive shaft 114 are mounted inside the housing unit 100 such that the drive shaft 114 juts out of the top of the motor 107, as defined in relation to the base and top of the housing unit 100. The drive shaft 114 is generally defined by a rod with two ends wherein one end is in contact with the motor 107 and typically extends from within motor 107 on one end, outwards from the motor 107 towards the top of the housing unit 100, through opening 102c in lid 102 such that the other end resides external to the housing unit 100. Flasher 115 is connected to the external end of the drive shaft 114 such that when the motor 107 acts upon and rotates drive shaft 114, the flasher 115 likewise rotates.

As depicted in the Figures, flasher 115 is a longitudinal object substantially in the shape of a wing with two opposing sides, at least one side being a more reflective side such as by being painted a bright color, preferably white, a tip end and a base end. A cylindrical recessed channel depends into the base end which is slightly diametrically larger than the drive shaft 114 such that at least a portion of the drive shaft 114 is capable of being inserted into the channel so as to form at least a partial friction fit. In a related embodiment, the channel can also be magnetized so as to magnetically attach to the drive shaft 114. In at least one embodiment, one side of the flasher 115 is a substantially brighter color than the other side. Thus, as the motor 107 rotates the drive shaft 114 and connected flasher 115, light will reflect more off the brighter side, causing the flasher 115 to "flash" at various points of view.

In various other embodiments, non-wing shaped flashers may be utilized. For example, a disk flasher can be utilized which is housed within a disk cover. Portions of the disk are painted in a light color such as white while the remainder of the disk is a dark color, preferably black. For example, viewing the disk as a pie, non-contiguous slices can be painted white while the remainder of the pie is painted black. The disk is housed within a mostly solid cover that has slots removed in its top layer. When actuated by the motor 107, the disk rotates within the cover, but the cover remains substantially stationary. Thus, the white pie slices will be visible and reflect light as they pass the cut-out portion(s) in the disk cover, causing a "flash" to occur. The same principle may be applied in varying shapes such as a three-dimensional conical structure inside a like-shaped cover, a tube structure, or a dome-shaped structure. Those persons having ordinary skill in the art will recognize that additional flasher shapes may utilized in this application, and nothing in this specification should be construed to limit the flasher shape to the provided example embodiments.

In certain embodiments, it may be advantageous for the flasher 115 to be removably connected to the drive shaft 114. For example, when transporting the apparatus, it may be desirable to separate the flasher 115 for ease of storage as the flasher 115 can be an oblong structure that juts out from the housing unit 100. Additionally, it may be possible for a flasher 115 to become damaged or dull during use, or it may simply be more advantageous to use a different flasher 115 under specific circumstances. Thus, it may be advantageous to remove the currently attached flasher 115 and replace it with a different flasher. As discussed, the flasher 115 is connected to the drive shaft 114 via a simple friction fit and the drive shaft connection point 115a. Additional components can be added such as a catch, mechanical fasteners 114a, or magnetics to more steadfastly connect the flasher 115 without rendering a permanent connection.

In other embodiments, the flasher can be permanently attached to drive shaft 114 through numerous means such as molding, fusion, epoxies or thermal insulation.

Inside motor housing body 101 is a series of components used for adequately mounting the motor 107 in the housing unit 100. Although a person having ordinary skill in the art would recognized numerous means of mounting the motor 107, some representative examples are depicted in FIG. 1 including a motor platform 108 with a series of divots and protrusions that correspond and mate with protrusions and divots on the underside of the motor 107 to help secure the motor into place.

Additionally, a series of motor housing columns 109, which are at least partially internally threaded, extend from the motor platform 108. When installing the motor 107, the motor 107 is placed on the motor platform 108 such that the protrusions extending from the base of the motor 107 correspond and mate with the divots on the surface of the motor platform 108, and the protrusions 8b extending upwards from the motor platform 108 correspond and mate with the divots in the bottom surface of the motor 107. Once the motor 107 is lined up and mated with the motor platform 108, a motor mount 106, which is a bracket, is placed on top of the motor 107 in such a manner that the drive shaft 114 spans through central hole 106a and the motor housing columns 109 match screw holes 106b. Connecting means, which are screws, are screwed through screw holes 106b and into motor housing columns 109, securing the motor 107 to the motor housing columns 109 and thus to the housing unit 100.

Cycler 110 is a timer chip which cycles power on and off to the motor 107. In one or more embodiments, cycler 110 is a variable timer ship which cycles power on and off to the motor 107 as determined by a random generation algorithm such that no pattern of cycling is generated. Preferably, the chip is set with minimum time increments to allow for the motor 107 to actually power on and manipulate the flasher 115; however, additional maximum limitations can also be set. For example, the chip is capable of cycling on and off at random between 1 second and one minute, 1 second and 30 seconds, 1 second and 10 seconds, or 1 second and 4 seconds. The maximum and minimum can be adjusted as determined by the motor 7 and desired application. Likewise, the cycler 110 can be set so as to cause full power to flow when cycled on, or it could limit the amount of power cycled. Because of the differential timer, each cycle could be for a different length, causing an intermittent flash.

Figure 3:
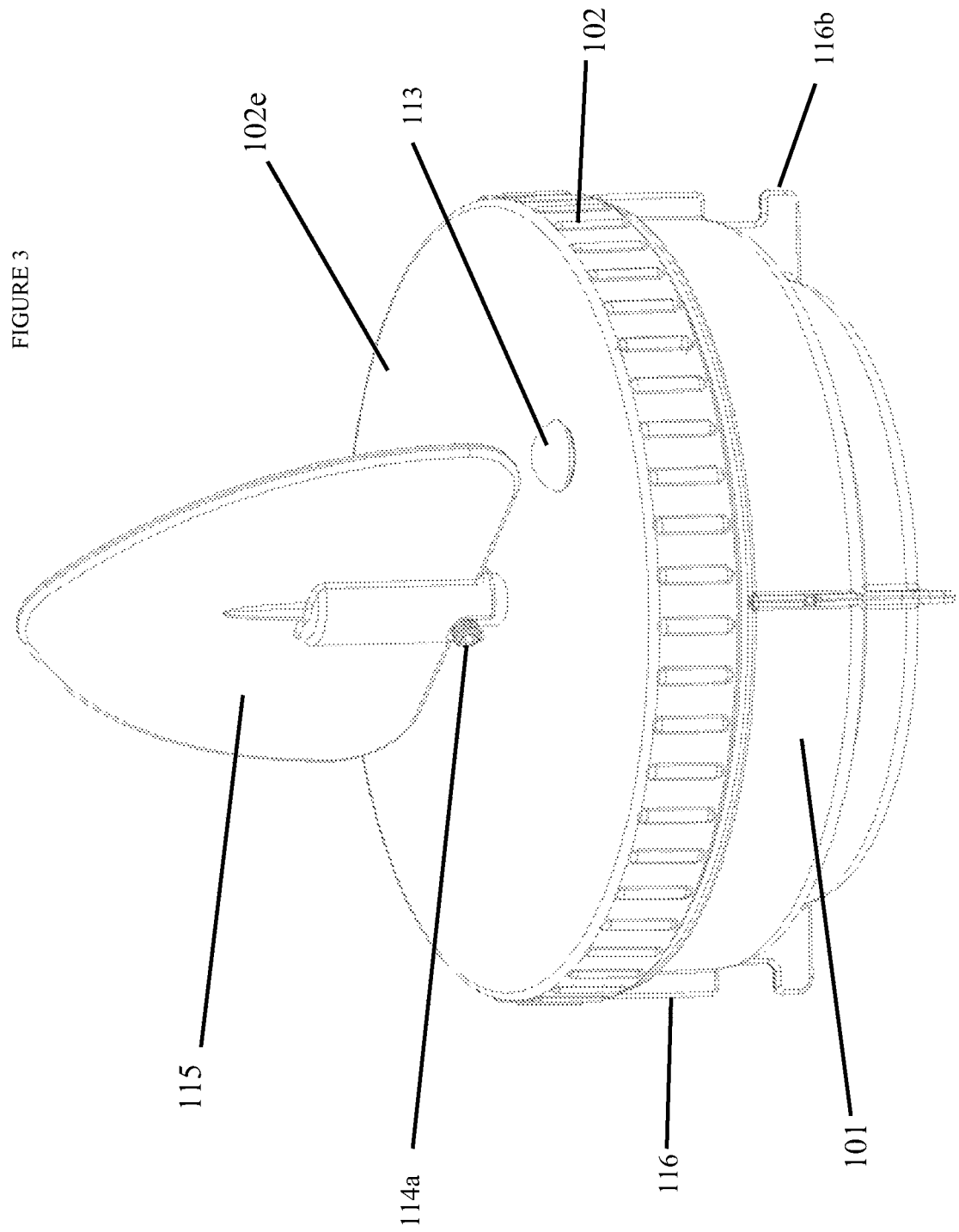
FIG. 3 shows an exterior view of an alternate embodiment of an intermittent flashing decoy apparatus such as for use in a marine environment.
Figure 4:
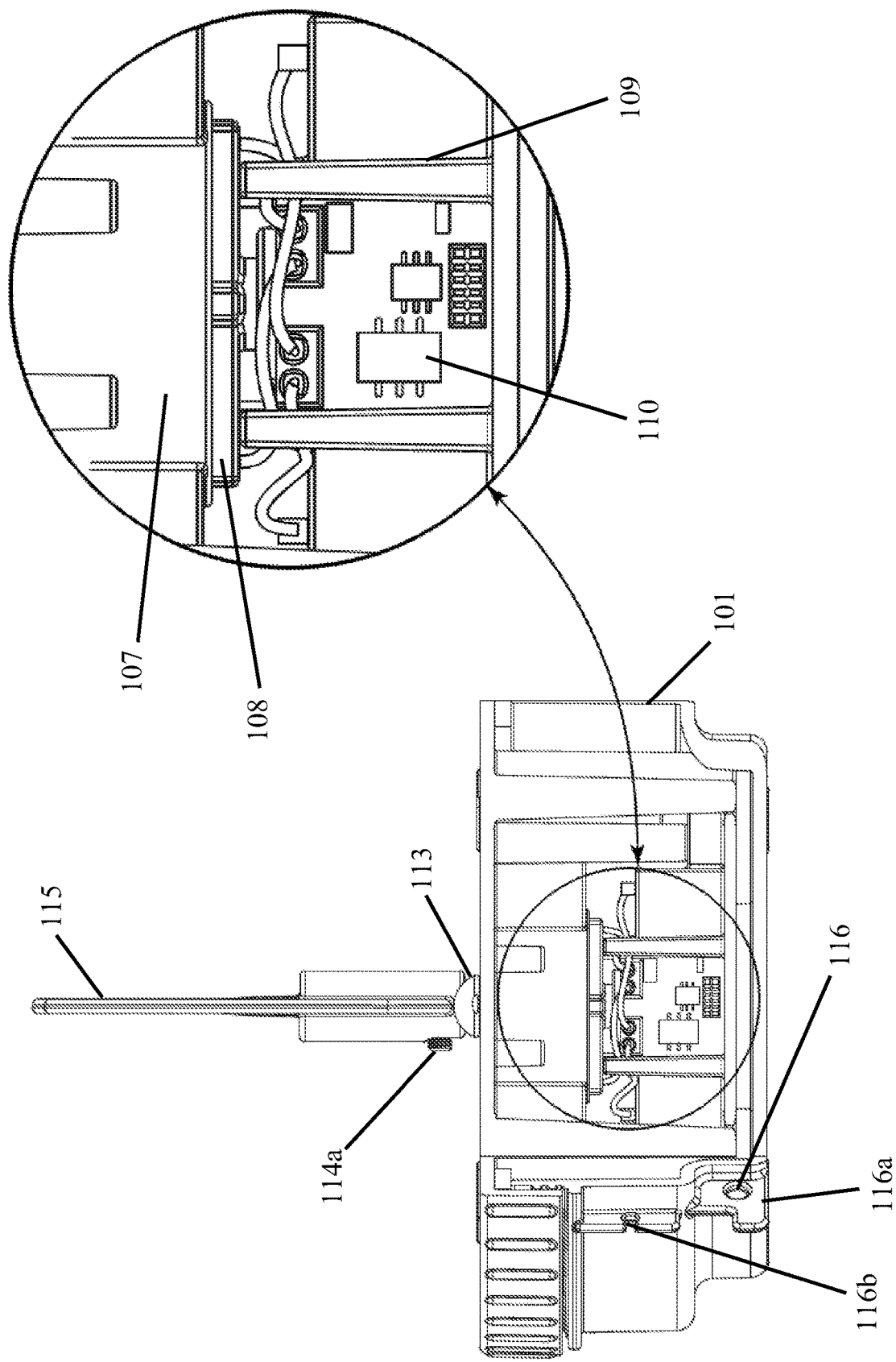
FIG. 4 is a cross sectional view of the embodiment depicted in FIG. 3.
Figure 5:
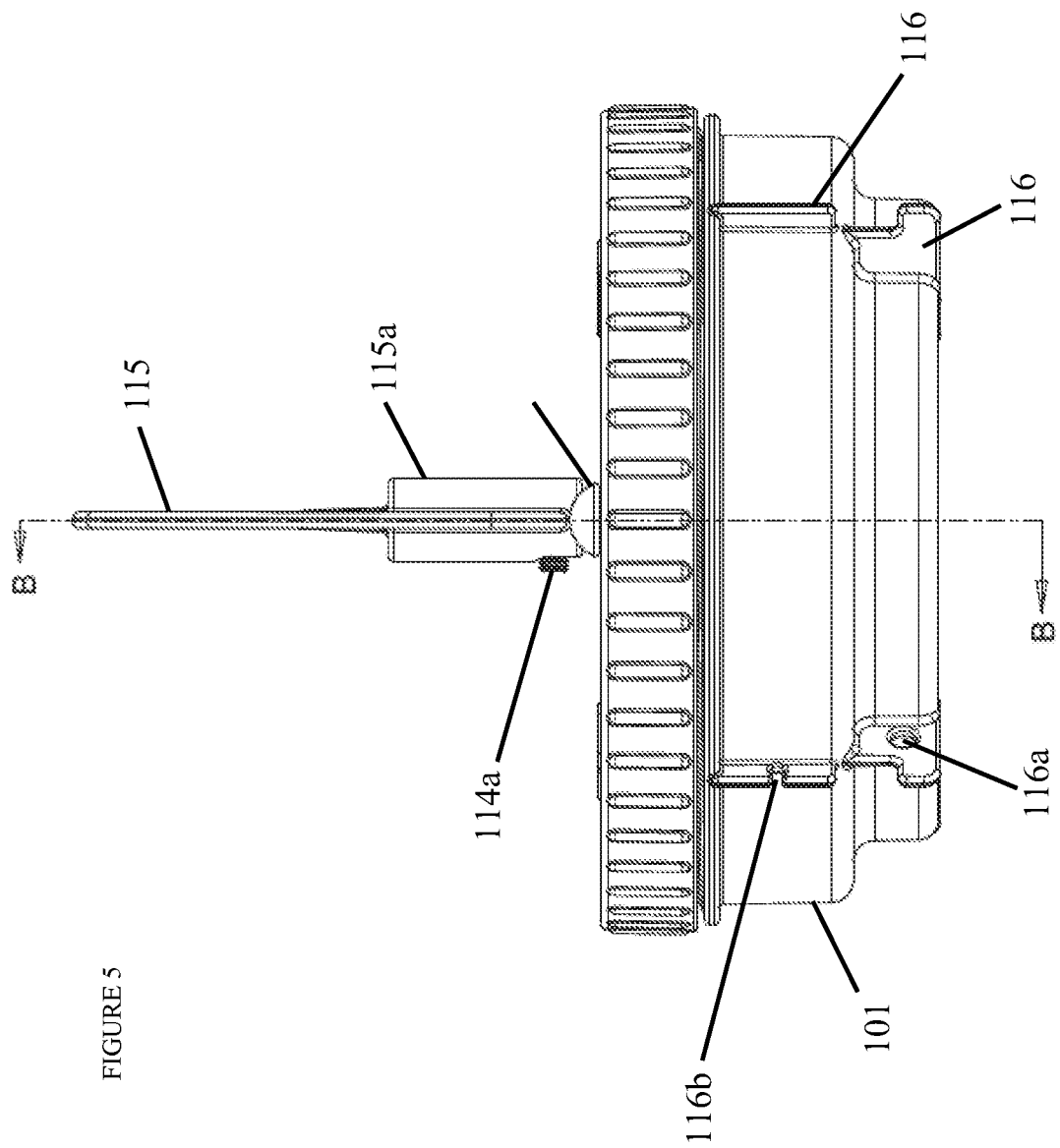
FIG. 5 is a side view of the embodiment of an intermittent flashing decoy apparatus to demonstrate the interplay of the components.
Figure 6:
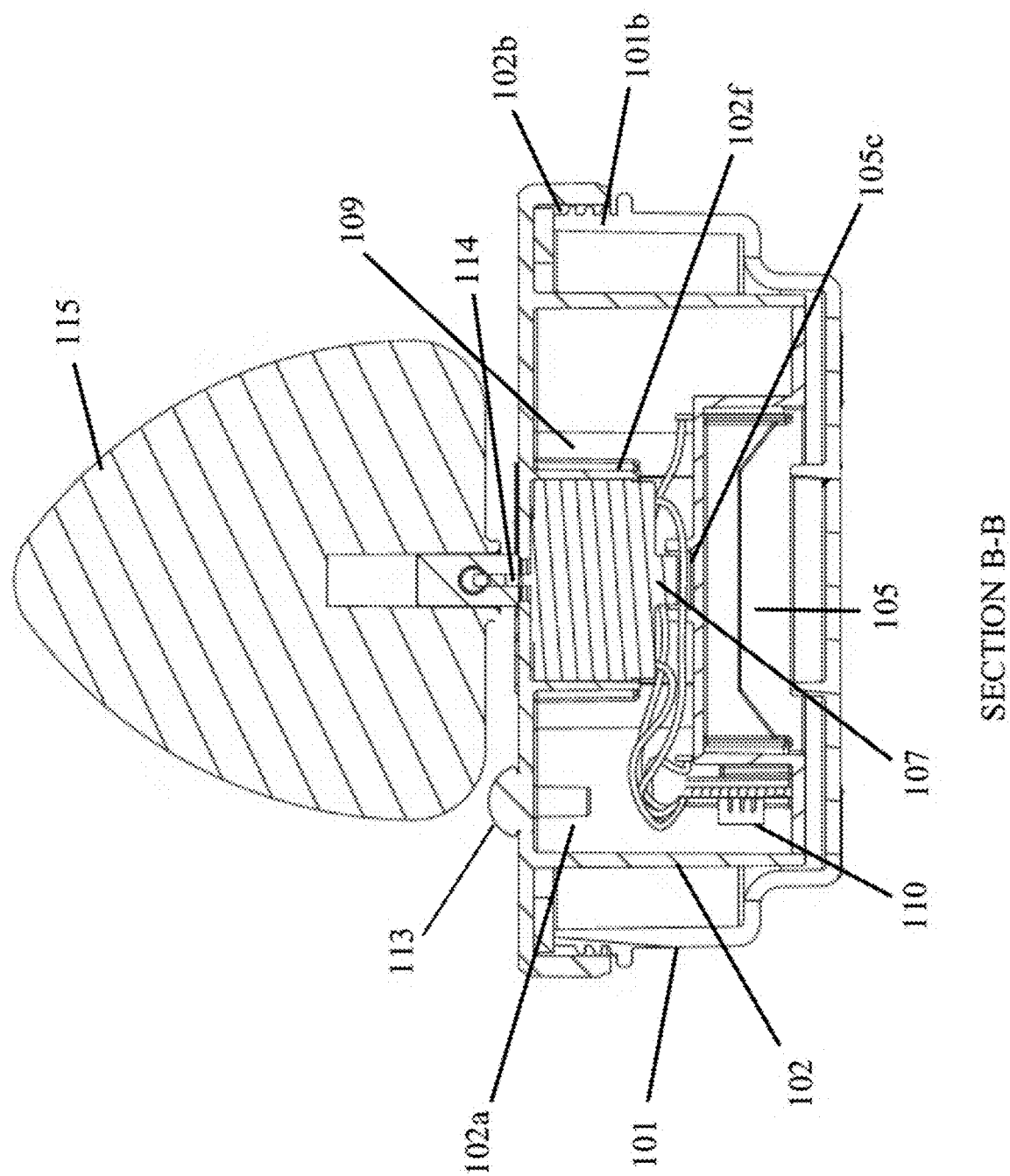
FIG. 6 is a cross sectional view showing an embodiment of an intermittent flashing decoy apparatus to demonstrate the interplay of the components.
Figure 7:
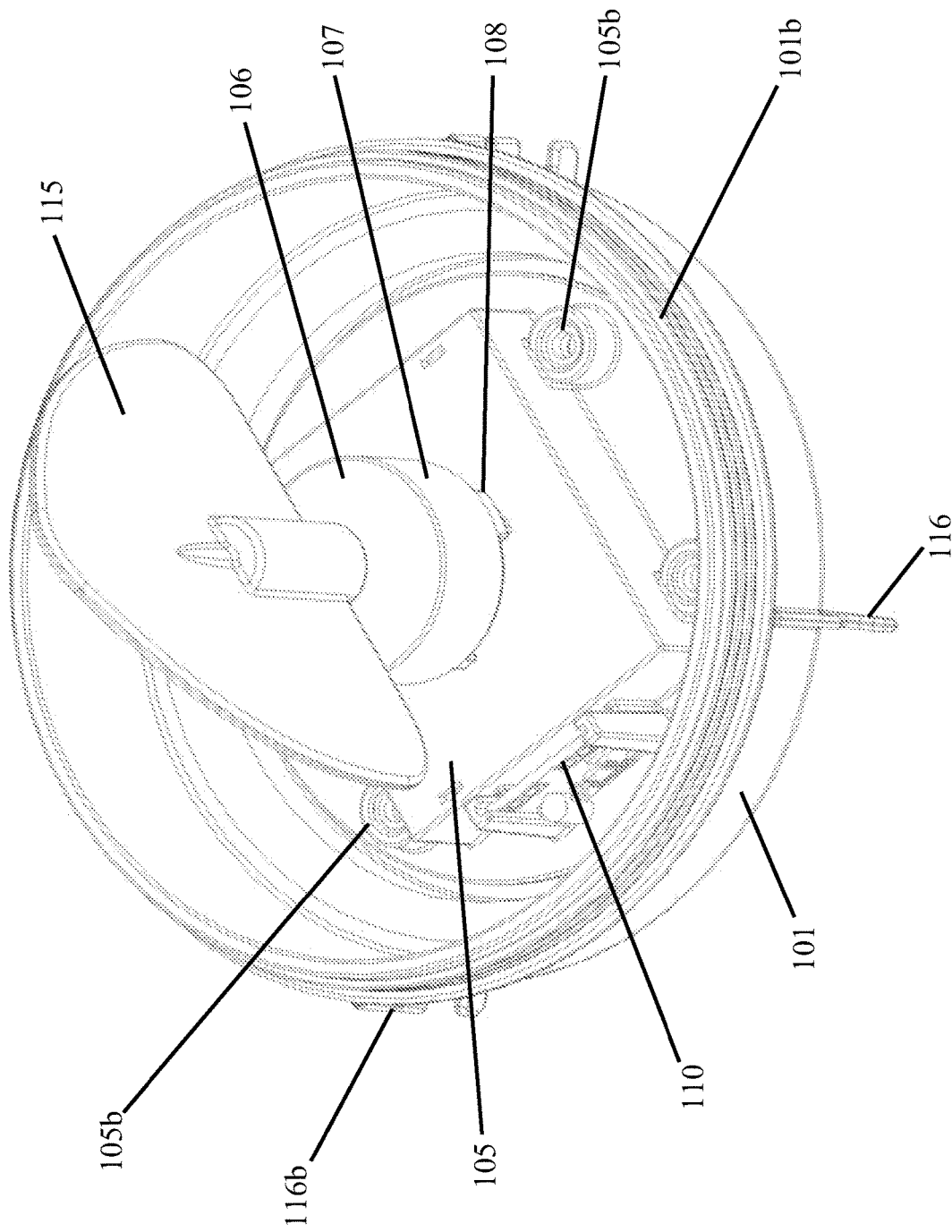
FIG. 7 is a top view showing an embodiment of intermittent flashing decoy apparatus to demonstrate the interplay of the components.
Figure 8:
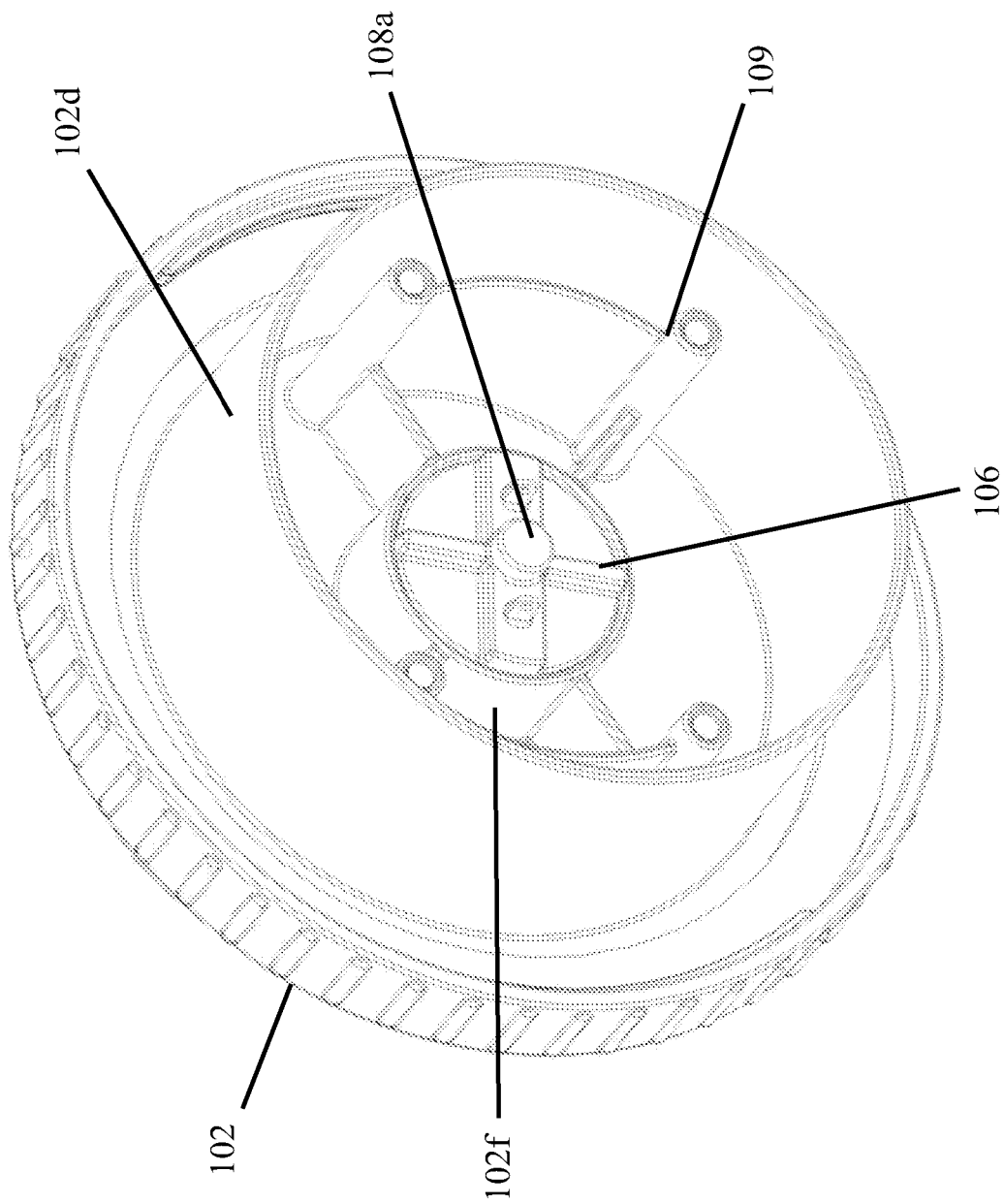
FIG. 8 is a bottom view showing an embodiment of intermittent flashing decoy apparatus to demonstrate the interplay of the components.
Figure 9:
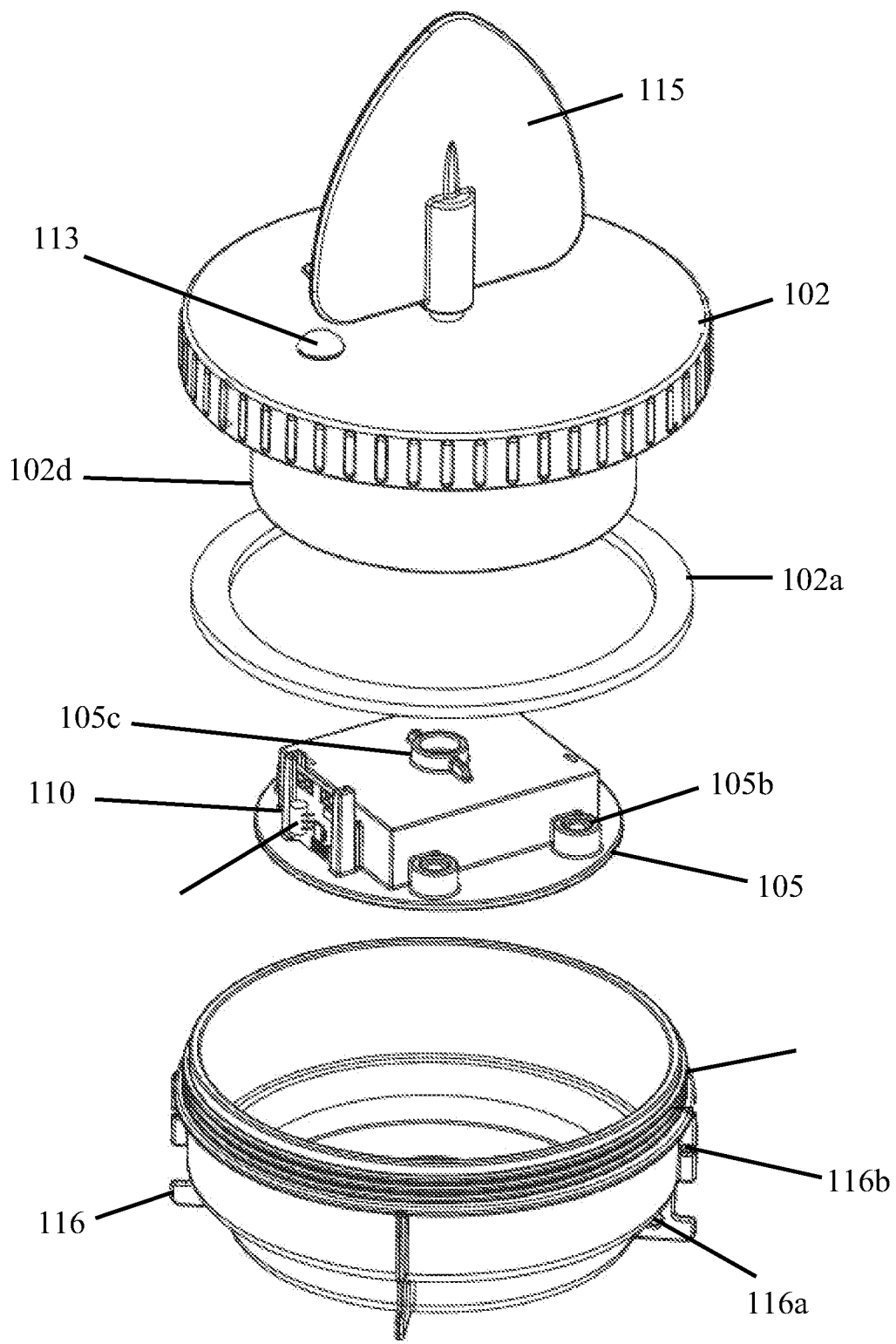
FIG. 9 is an expanded view showing an embodiment of intermittent flashing decoy apparatus to demonstrate the interplay of the components.

As previously indicated, numerous embodiments including the one depicted in FIGS. 1 and 3, are envisioned wherein the Intermittent Flashing Decoy Apparatus, Method and System is intended to be used as a floating decoy such as for waterfowl hunting. In such an embodiment, the housing unit 100 will comprise an at least partially buoyant apparatus such that at least the flasher 115, which is connected to a drive shaft 114 that protrudes from the housing unit 100, will be displaced above the water, thereby allowing the flasher 115 to move or spin freely without intervention by the water. In such embodiments wherein the apparatus is intended to act as a floating decoy, the housing unit 100 may also comprise a keel component 116 which acts to counter the forces caused by the motion of the flasher 115 and keep the apparatus upright.

It is preferable that power source 105a is a mobile power source. For this reason, the power source 105a is depicted as a pair of AA batteries; however, one having ordinary skill in the art would readily recognize that the power source 105a will depend on numerous factors including the motor 107, the amount of energy required to run the motor 107, and the drag caused by the operation of the flasher 115.

A system of using intermittent flashing decoys is likewise included in the present invention. When it is desired to mimic the flashing of animals which travel in groups of flocks, such as waterfowls, particularly ducks, two or more intermittent flashing decoy apparatuses can be used in conjunction with each other. For example, when hunting waterfowl, numerous floating apparatuses can be deployed in conjunction with each other in a body of water such to simulate a feeding flock of birds. Because the cycler 110 in each apparatus would randomly determine each on/off cycle, no two decoys would consistently "flash" in concert with each other, providing an overall randomized flashing throughout the group which is more natural to a real flock of feeding ducks.

It may also be possible to create the illusion of a real flock without the cycler 110 being a variable timer chip and instead being a fixed timer chip. For example, even if two or more intermittent flashing decoys are deployed, each with a fixed timer chip (for example a 3 second on, three second off timer), the appearance of a variable flock can be obtained by starting at least two decoy apparatuses at different times. Each decoy would act independently of each other by turning on and off at the three second interval; however, they would not activate and deactivate at the same time, creating a variable flash across the decoys.

Another embodiment of the intermittent flashing decoy apparatus is depicted in FIG. 3 in which the components are reconfigured to further waterproof the electrical components from the ambient environment. The depicted embodiment of the housing unit 100 internalizes all electrical components including the power source 105a by enclosing the motor 107, the power source bay 105, and the power source 105a in a substantially waterproof chamber formed between the lid 102 and the external housing 101.

As shown, lid 102 comprises a circular shaped top 102e which corresponds in shape to the open end of housing 101. A set of cylindrical walls depend from the interior side of lid 102, each of which defines a chamber, in addition to a plurality of connector columns 109. The first cylindrical wall is an outer cylindrical wall 102d that when connected to the batter unit holster 105 forms an interior chamber that houses the motor components. This interior chamber will house the cycler 110, the motor 7, the electronic portions of the on-off switch 111.

In the previous embodiment, the at least partially threaded columns 109 were used to connect the motor platform 108 to the housing unit 100, thereby securing the motor 107 in place. In the present embodiment 100 as depicted in FIG. 3, columns 109 depend from the lid 102 and connect the battery holster unit to the lid 102, thereby creating an interior chamber between the interior of lid 102, outer column wall 102d, and the top of battery holster unit 105d. In this embodiment 100, screw fasteners are inserted through holes 105b in the battery unit holster 105d, securing the battery holster unit 105d to the lid 102 and creating an envelope.

Within the outer cylindrical wall 102d, a smaller cylindrical wall 102f depends from the center of the lid 102 that is slightly diametrically larger than the motor 107. A motor mount 106 is connected to both the motor and the lid 102, thereby securing the motor 7 in place to the lid 102. Moreover, a motor platform 108 secures the motor 7 within the interior chamber defined by the interior cylindrical wall. As with the previously disclosed embodiment, the drive shaft 114 extends outwards from the motor 7, through opening 102c in the lid 102 where it is connected to flasher 115.

To further secure the motor 7 in place, a spacer connection can be made between the bottom of motor platform 108 and the top of battery holster unit 105. As depicted, this spacer is in the form of a cylindrical protrusion 108a extending downward from the bottom of platform 108 that mates and sockets into a hollow cylindrical socket 105c extending upwards from the top of battery holster unit 105d.

With all the components in place, the battery 105a can be loaded into the battery holster unit 105d, and the housing 101 can be threadably connected the lid 102. It is preferable, although not necessary, that the buoyancy of decoy 100 is sufficient such that the threaded connection between lid 102 and housing 101 sits above the water when in use. Although the present embodiment 100 is designed to be substantially waterproof, washers and seals can be employed to safeguard against the leakage of water into the unit.

Turning to the bottom of housing 101, a plurality of protrusions are noticed which act like rudders or keel components 116. At least one of the keel components 116 will have a connector 116a which is a hole that will allow a rope, string, or other tether to be connected to the decoy apparatus. Additionally, at least two of the keel components 116 will have a secondary stringer divot 116b which allows for string to be caught as it is wrapped around the decoy apparatus for storage.

For the purpose of understanding the Intermittent Flashing Decoy Apparatus, Method and System, references are made in the text to exemplary embodiments of an Intermittent Flashing Decoy Apparatus, Method and System, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the Intermittent Flashing Decoy Apparatus, Method and System may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

The invention claimed is:

1. A wildlife attracting apparatus comprising:
   a. a housing unit;
   b. a motor;
   c. a power source;
   d. a cycler, and
   e. a flasher,
   wherein at least the motor and cycler are housed within the housing unit, wherein at least a portion of the flasher is located outside the housing unit, wherein the power source is in electronic communication with the motor and the cycler, wherein the cycler selectively controls the power to the motor, wherein the motor is connected to the flasher such that the motor causes the flasher to rotate around a central vertical axis of the flasher, thereby causing a flash to appear as ambient light strikes and is reflected off the rotating flasher.

2. The wildlife attracting apparatus of claim 1 wherein the cycler is a timer chip.

3. The wildlife attracting apparatus of claim 2 wherein the timer chip is capable of intermittently providing power to the motor.

4. The wildlife attracting apparatus of claim 3 wherein the timer chip operates on a random time generation algorithm and wherein a minimum and a maximum time interval is set.

5. The wildlife attracting apparatus of claim 1 further comprising a switch which is capable of controlling the power on and off of the apparatus.

6. The wildlife attracting apparatus of claim 1 wherein the flasher is a wing-shaped component wherein a part of the flasher is more capable of reflecting light that the rest of the flasher.

7. The wildlife attracting apparatus of claim 6 wherein the flasher comprises two sides and one side is more reflective than the other side.

8. The wildlife attracting apparatus of claim 1 wherein the flasher is a disk component wherein a portion of the flasher is more capable of reflecting light that the rest of the flasher.

9. The wildlife attracting apparatus of claim 8 wherein the flasher comprises two sides and one side is more reflective than the other side.

10. The wildlife attracting apparatus of claim 1 wherein the power source is a battery.

11. The wildlife attracting apparatus of claim 1 further comprising a switch which is capable of controlling the power on and off of the apparatus.

12. The wildlife attracting apparatus of claim 1 wherein the motor is selected from a group comprising an AC motor, a DC motor, a non-geared motor or a gear motor.

13. The apparatus of claim 1 wherein the housing unit is capable of preventing water from coming into contact with the cycler and the power source.

14. The wildlife attracting apparatus of claim 1 wherein the flasher is selected from a group of components of a wing-shaped component, a disk, a dome or a tube.

15. A buoyant wildlife attracting apparatus comprising:
 a. a waterproof housing unit;
 b. a motor;
 c. a power source;
 d. a cycler, and
 e. a flasher,
 wherein at least the motor and cycler are housed within the waterproof housing unit, wherein at least a portion of the flasher is located outside the waterproof housing unit, such that at least said flasher is capable of protruding above the water surface when said buoyant wildlife attracting apparatus is located in water, wherein the power source is in electronic communication with the motor and the cycler, wherein the cycler selectively controls the power to the motor, wherein the motor is connected to the flasher such that the motor causes the flasher to rotate around a central vertical axis of the flasher thereby causing a flash to appear as ambient light strikes and is reflected off the rotating flasher.

16. The buoyant wildlife attracting apparatus of claim 15 wherein said housing unit further comprises a bottom portion and a top portion and said bottom portion comprises a stabilizer component.

* * * * *